United States Patent
Takabayashi

(10) Patent No.: US 6,572,023 B2
(45) Date of Patent: Jun. 3, 2003

(54) INTEGRATED CIRCUIT CARD

(75) Inventor: Yasutaka Takabayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/893,502

(22) Filed: Jun. 29, 2001

(65) Prior Publication Data

US 2002/0003168 A1 Jan. 10, 2002

(30) Foreign Application Priority Data

Jul. 10, 2000 (JP) .................................. 2000-208556

(51) Int. Cl.⁷ ............................................... G06K 5/00
(52) U.S. Cl. ...................................................... 235/492
(58) Field of Search ........................................ 235/492

(56) References Cited

U.S. PATENT DOCUMENTS

| | | |
|---|---|---|
| 5,206,495 A | 4/1993 | Kreft |
| 5,929,414 A * | 7/1999 | Saitoh .......................... 235/380 |
| 6,105,874 A * | 8/2000 | Berger et al. ................ 235/492 |
| 6,145,749 A * | 11/2000 | Thuringer et al. ........... 235/492 |

* cited by examiner

Primary Examiner—Mark Tremblay
(74) Attorney, Agent, or Firm—Rabin & Berdo, P.C.

(57) ABSTRACT

An integrated circuit card includes terminals for receiving data, a first control signal and a power supply by mechanical contact to the terminals and a coil for receiving data, a second control signal and a power supply by electromagnetic induction. The integrated circuit card also includes a mode designating circuit for designating a contact mode prior to the second control signal during the first control signal is received therein and for designating a contact-free mode during the second control signal is received therein. The integrated circuit card also includes a processing circuit for operating in the contact mode based on the contact mode designated by the mode designating circuit and for operating in the contact-free mode based on the contact-free mode designated by the mode designating circuit.

14 Claims, 3 Drawing Sheets

INTEGRATED CIRCUIT CARD

BACKGROUND OF THE INVENTION

1. Field of the Invention

The present invention generally relates to an Integrated Circuit Card in which a semiconductor chip is embedded. Such Integrated Circuit Card is commonly referred to as IC card. More particularly, the present invention relates to a dual mode type IC card that has a contact-free mode and a contact mode. The contact-free mode is a mode where electrical energy is supplied from a reader/writer by an inductive coupling and a data transmission between the IC card and the reader/writer is performed by the inductive coupling. The contact mode is a mode where electrical energy is supplied from the reader/writer via a contact terminal of the IC card and the data transmission is performed via the contact terminal.

This application relies for priority on Japanese patent application, Serial Number 208556/2000, filed Jul. 10, 2000, which is incorporated herein by reference in its entirety.

2. Description of the Related Art

In such this technical field, an IC card of the dual mode type is described in, for example, U.S. Pat. No. 5,206,495 as a related art.

FIG. 2 is a schematic block diagram showing the IC card of the related art.

The IC card has a contact terminal 203, a coil 204 and a coil 205. The contact terminal 203 is contacted with a terminal of a reader/writer in the contact mode and receives electrical energy via the contacted terminal of the reader/writer. Bi-directional data transmission between the IC card and the reader/writer is executed via the contact terminal 203 in the contact mode.

The coils 204 and 205 are inductive coupled to a coil of the reader/writer in the contact-free mode and receive electrical energy. The coils 204 and 205 perform the data transmission between the IC card and the reader/writer and receive electrical energy from the reader/writer.

The coils 204 and 205 are connected to a voltage rectification device 211 and a serial/parallel converter 214 in a switching element 210. The voltage rectification device 211 rectifies an alternating signal (AC signal) induced in the coils 204 and 205 and generates a direct voltage (DC voltage) U1. The DC voltage U1 is applied to an input terminal E1 of a comparator 212 and a power supply terminal E4 of the comparator 212 through a diode D1. The DC voltage U1 is also applied to a serial/parallel converter 214. The serial/parallel converter 214 is connected to a multiplexer 213.

Signal lines I1 through I6 are connected to the multiplexer 213. The signal line I6 (it is also referred to as a power supply line I6), which receives electrical energy from the contact terminal 203, is connected to an input terminal E2 and the power supply terminal E4 through a diode D2.

The comparator 212 compares a voltage at the input terminal E1 with a voltage at the input terminal E2 and outputs a select signal as a result of the comparison from an output terminal E3. The multiplexer 213 selects the serial/parallel converter 214 in response to the select signal when the voltage at the input terminal E1 is higher than the voltage at the input terminal E2 and selects the contact terminal 203 in response to the select signal when the voltage at the input terminal E1 is lower than the voltage at the input terminal E2. A microprocessor 220 is connected to the multiplexer 213.

When the IC card illustrated in FIG. 2 operates in the contact mode, the power supply voltage (electrical energy) is supplied from the contact terminal 203. The power supply voltage is transferred to the input terminal E2 and the power supply terminal E4 through the power supply line I6. At this time, since AC signal is not induced in the coils 204 and 205, DC signal U1 is not generated by the voltage rectification device 211. Thus, the comparator 212 outputs the select signal so that the multiplexer 213 selects the contact terminal 203. As a result, the microprocessor 220 is connected to the reader/writer through the contact terminal 203.

When the IC card illustrated in FIG. 2 operates in the contact-free mode, the voltage rectification device 211 rectifies AC signal induced in the coils 204 and 205 and generates the DC voltage U1. The DC voltage U1 is transferred to the input terminal E1 and the power supply terminal E4. At this time, since the power supply voltage is not supplied to the power supply line I6, the comparator 212 outputs the select signal so that the multiplexer 213 selects the serial/parallel converter 214. Thus, the microprocessor 220 is magnetically coupled to the reader/writer through the coils 204 and 205.

However, such this conventional IC card has a problem to be solved as explained bellow.

In a case where a strong alternating signal is induced in the coils 204 and 205 due to the noise etc. when the IC card operates in the contact mode (that is, the contact terminal 203 is contacted with the reader/writer), the voltage rectification device 211 rectifies the induced alternating signal and generates DC voltage U1. If the generated DC voltage U1 exceeds the power supply voltage supplied to the power supply line I6 through the contact terminal 203, the voltage at the input terminal E1 of the comparator 212 exceeds the voltage at the input terminal E2. At this time, the selection of the multiplexer 213 changes to the other selection. That is, although the IC card operates in the contact mode, the multiplexer 213 selects the serial/parallel converter 214 in response to the selection signal output from the output terminal E3. As a result, the microprocessor 220 may not continue to operate in the contact mode.

Consequently, there has been a need for an IC card that can keep an operation of the contact mode even though undesirable AC signal is induced in the coils due to the noise.

SUMMARY OF THE INVENTION

It is an object of the present invention is to provide an integrated circuit card that is seldom influenced by noise.

According to an aspect of the present invention, for achieving one or more of the above objects, there is provided a semiconductor integrated circuit that includes terminals for receiving data, a first control signal and a power supply by mechanical contact to the terminals and a coil for receiving data, a second control signal and a power supply by electromagnetic induction. The integrated circuit card also includes a mode designating circuit for designating a contact mode prior to the second control signal during the first control signal is received therein and for designating a contact-free mode during the second control signal is received therein. The integrated circuit card further includes a processing circuit for operating in the contact mode based on the contact mode designated by the mode designating circuit and for operating in the contact-free mode based on the contact-free mode designated by the mode designating circuit.

The above and further objects and novel features of the invention will more fully appear from the following detailed description, appended claims, and accompanying drawings.

DETAILED DESCRIPTION OF THE PREFERRED EMBODIMENT

An integrated circuit card according to the present invention will be explained hereinafter with reference to figures.

Figure 1:
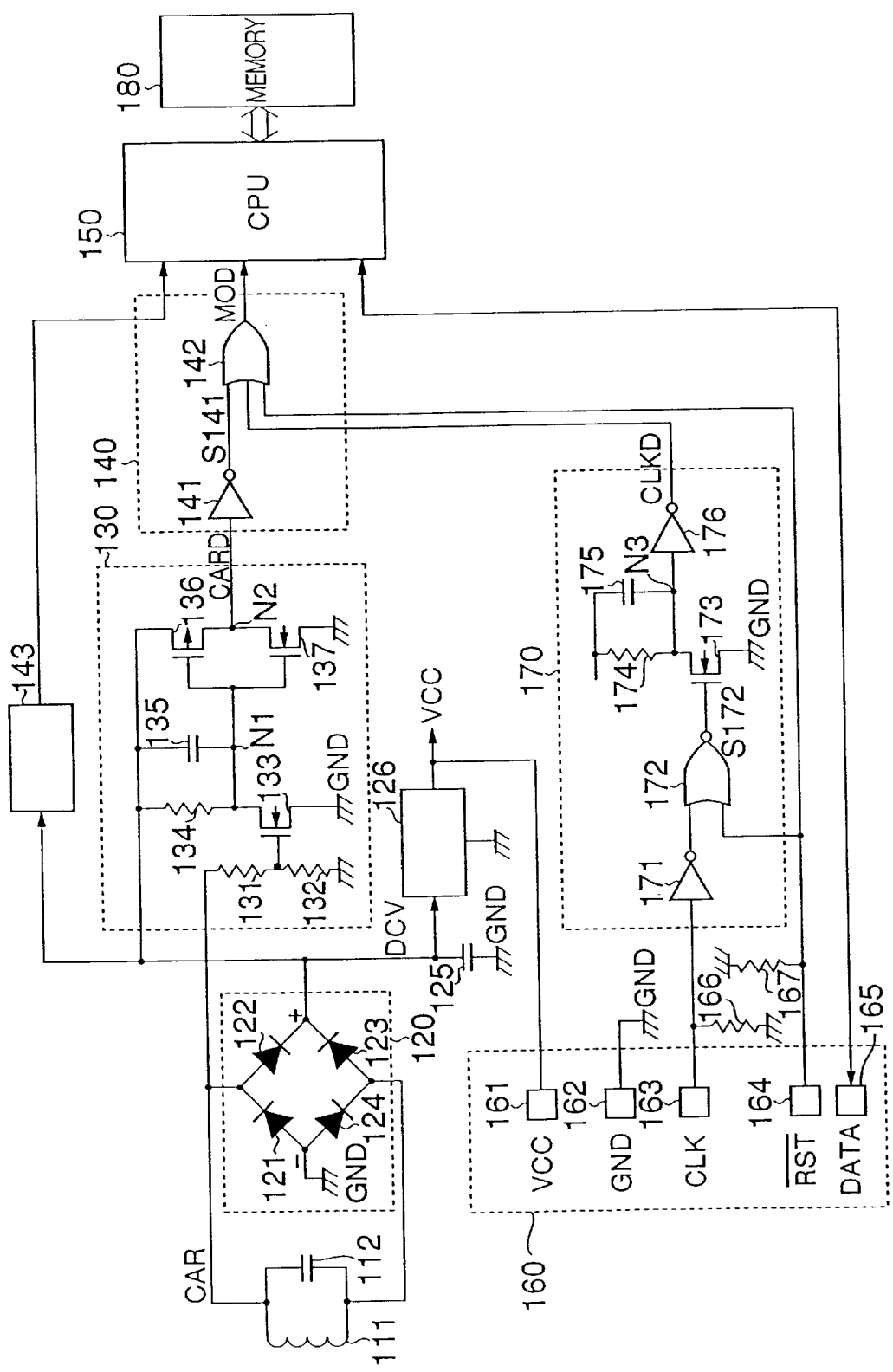
FIG. 1 is a schematic circuit diagram showing the integrated circuit card according to a preferred embodiment of the present invention.
Figure 2:
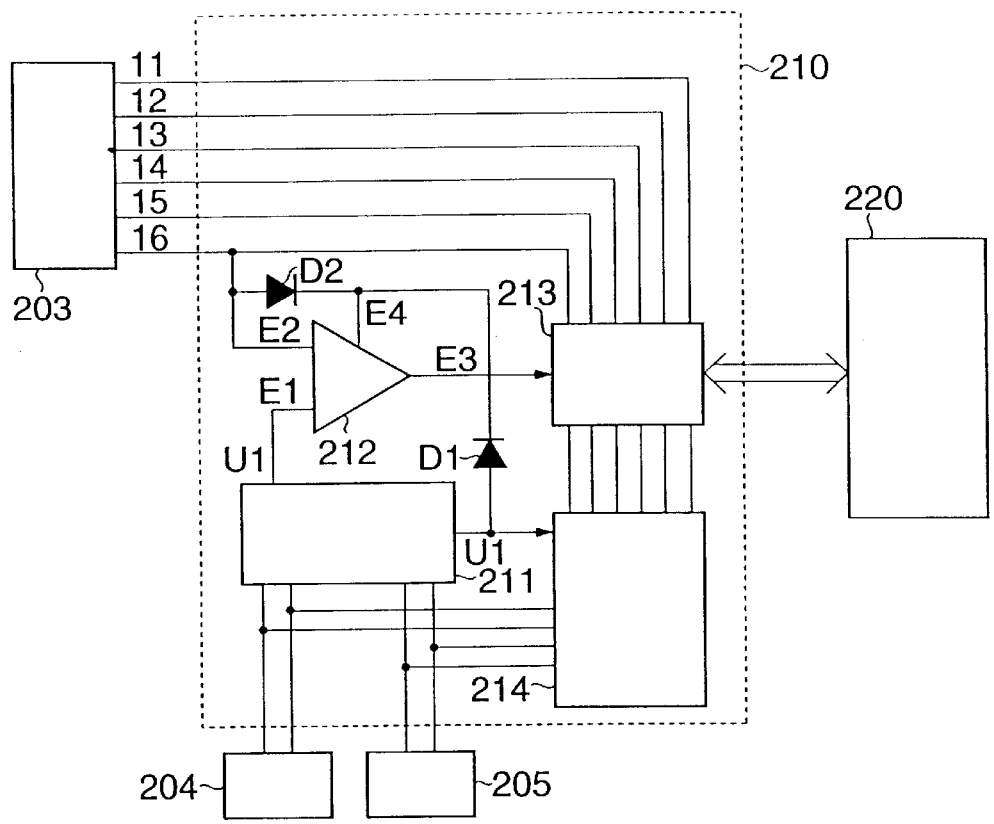
FIG. 2 is a schematic block diagram showing an IC card of the related art.

FIG. 1 is a schematic circuit diagram showing the integrated circuit card according to a preferred embodiment of the present invention.

The IC card is a dual mode type IC card that operates in both a contact-free mode and a contact mode. The contact-free mode is a mode where electrical energy is supplied from a reader/writer by an inductive coupling and a data transmission between the IC card and the reader/writer is performed by the inductive coupling. The contact mode is a mode where electrical energy is supplied from the reader/writer via a contact terminal of the IC card and the data transmission is performed via the contact terminal.

The IC card includes a coil 111 and a contact field 160. The coil 111 inductively couples the IC card to the reader/writer in the contact-free mode. The contact field 160 includes contact terminals 161 through 165 each of which is contacted with a corresponding terminal of the reader/writer in the contact mode.

The coil 111 receives electrical energy from the reader/writer based on the electromagnetic induction effect and performs a bi-directional data transmission between the IC card and the reader/writer. A resonance capacitor 112 is connected to the coil 111 in parallel. The constant values of the coil 111 and the capacitor 112 are set at predetermined values so that the values are tuned to a frequency of a carrier wave CAR serving as power supply voltage and data supplied from the reader/writer. The carrier wave CAR is obtained by an amplitude modulation that modulates a sinewave of 13.56 MHz by a 106 kb/s data signal. The degree of modulation in this case is set at about 10%. The power supply voltage is transmitted by a carrier component of the carrier wave. The data is transmitted by the amplitude modulation component.

The coil 111 and the capacitor 112 are connected to a voltage rectification part 120 for performing a full-wave rectification. The voltage rectification part 120 is comprised of four diodes 121 through 124 which are connected in a bridged form. A positive output + of the voltage rectification part 120 is connected to a smoothing capacitor 125 and a power supply part 126. A negative output − of the voltage rectification part 120 is connected to a ground potential GND. The power supply part 126 receives a direct voltage DCV obtained from the positive output + of the voltage rectification part 120 and generates a power supply voltage VCC having a constant level to supply to circuits in the IC card. That is, the power supply part 126 functions as a constant voltage generator. The positive output + of the voltage rectification part 120 and one end of the coil 111 are connected to a carrier detection part 130.

The carrier detection part 130 detects whether the effective carrier wave CAR is received. The carrier detection part 130 includes resistors 131 and 132 which divides a voltage induced in the coil 111. A node between the resistor 131 and the resistor 132 is connected to a gate of an N channel type MOS transistor 133 (it is hereinafter referred to as an NMOS). A source and a drain of the NMOS 133 are connected to the ground potential GND and a node N1, respectively. A resistor 134 serving as a load and a capacitor 135 for by-passing a frequency of the carrier wave CAR are connected between the node N1 and the positive output + of the voltage rectification part 120 in parallel.

The node N1 is connected to a gate of a P type MOS transistor 136 (it is hereinafter referred to as a PMOS) and a gate of an NMOS 137. A source and a drain of the PMOS 136 are connected to the positive output + of the voltage rectification part 120 and a node N2, respectively. A drain and a source of the NMOS 137 are connected to the node N2 and the ground potential GND, respectively. A carrier detection signal CARD is output from the node N2. The node N2 is coupled to a first input terminal of a mode direction circuit 140. The mode direction circuit 140 is made up of an inverter 141 and an OR circuit 142.

A demodulator 143 is connected to the positive output + of the voltage rectification part 120. The demodulator 143 demodulates data component in the direct voltage DCV which is full-wave rectified by the voltage rectification part 120. The demodulator 143 outputs the demodulated data as transmitted data to a central processing unit 150 (CPU).

The contact field 160 includes contact terminals 161 through 165. These contact terminals are electrically or mechanically contacted with corresponding terminals of the reader/writer in the contact mode and have function of receiving electrical energy or signals. The contact terminal 161 is a terminal that receives electrical energy via the contacted terminal of the reader/writer in the contact mode. Since the contact terminal 161 is connected to an output terminal of the power supply part 126, the power supply voltage VCC from the reader/writer is supplied to circuits in the IC card in the contact mode. The contact terminal 162 is a terminal that receives the ground potential GND via the contacted terminal of the reader/writer in the contact mode. Since the contact terminal 162 is connected to a common node of the circuits in the IC card, ground potential GND from the reader/writer is supplied to the circuits in the IC card in the contact mode as well as the power supply voltage VCC. The contact terminal 165 is connected to the CPU 150. The bi-directional data transmission between the CPU 150 and reader/writer is executed via the contact terminal 165. The data are preferably transmitted to/from the CPU in serial. The contact terminal 163 is a terminal that receives a clock signal CLK The clock signal CLK is a control signal which is supplied from the reader/writer and has a constant frequency, for example 5 MHz. The circuits in the IC card operate based on the clock signal CLK The contact terminal 164 is a terminal that receives a reset signal /RST. ("/" designates inverse of the reset signal RST) The reset signal /RST is the control signal from the reader/writer. When the reset signal /RST is a L level, the IC card is set to a reset state and thus operation is halted. When the reset signal /RST is an H level, the IC card is set to an operation state and thus IC card can operate. The contact terminals 163 and 164 are connected to the ground potential GND via pull-down resistors 166 and 167. The contact terminals 163 and 164 are further connected to a clock detection part 170.

The clock detection part 170 has an inverter 171 and a NOR circuit 172. An input terminal of the inverter 171 is connected to the contact terminal 163. An output terminal of the inverter 171 is connected to a first input terminal of the NOR circuit 172. A second input terminal of the NOR circuit 172 is connected to the contact terminal 164. An output terminal of the NOR circuit 172 is connected to a gate of an NMOS 73. A source and a drain of the NMOS 73 are connected to the ground potential GND and a node N3, respectively. The node N3 is connected to the power supply voltage VCC via a load resistor 174 and a capacitor 175 for bypassing a component of the clock frequency. The node N3 is further connected to an inverter 176 which outputs a clock detection signal CLKD.

The clock detection signal CLKD output from the inverter 176 and the reset signal /RST applied to the contact terminal 164 are applied to second and third input terminals of the mode direction circuit 140. The mode direction circuit 140 outputs a mode signal MOD. The CPU 150 receives the mode signal MOD. The mode signal MOD is set to the L level in the contact-free mode and is set to the H level in the contact mode.

The IC card of the preferred embodiment further has a memory part 180 connected to the CPU 150, such as read only memory (ROM), electrical programmable read only memory (EPROM). The IC card also has a modulator for outputting a transmission data to the coil 111 in the contact-free mode and a clock signal regeneration part for regenerating a clock signal from the carrier wave CAR and outputting the regenerated clock signal to the CPU 150. However, these are not shown.

Figure 3:
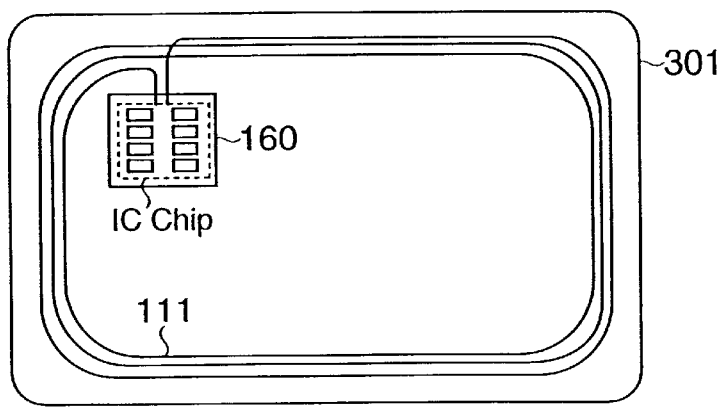
FIG. 3 is a perspective view of the IC card shown in FIG. 1.

FIG. 3 is a perspective view of the IC card shown in FIG. 1.

As shown in FIG. 3, the IC card is made up of a body 301 made of plastic, an IC chip and the contact field 160. The body 301 has 54 millimeters in length, 86 millimeters in width and 0.76 millimeters in thickness. The coil 111, and the IC chip and the contact field 160 are embedded in the body 301. The CPU 150, the memory part 180, the voltage rectification part 120, the power supply part 126, the carrier detection part 130, the mode direction circuit 140, the clock detection part 180, and so on are integrated into the IC chip. The IC chip is adhered to a back surface of the contact field 160. Electrodes of the IC chip are wire bonded to corresponding contact terminals of the contact field 160. The contact field 160 is disposed at a predetermined location on the IC card so as to satisfy a standardized location. Besides, the size of the coil and the location at which the coil 111 is formed are depended on the circumstances. In FIG. 3, a triple curled coil 111 is patterned at the periphery of the body 301. Thus, even though the distance between the reader/writer and the IC card is set at 10 centimeters in the contact-free mode, normal contact-free mode operation can be performed.

Figure 4:
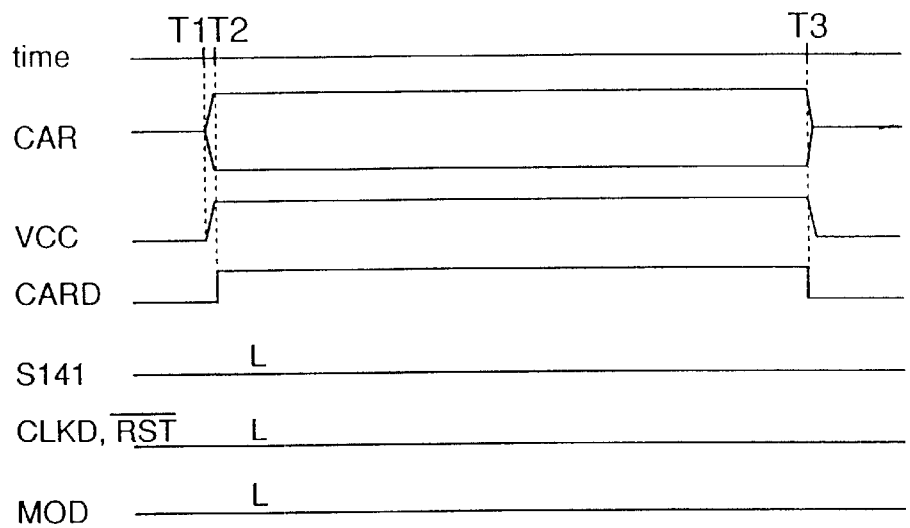
FIG. 4 is a timing chart showing an operation of the IC card according to the present invention in the contact-free mode.
Figure 5:
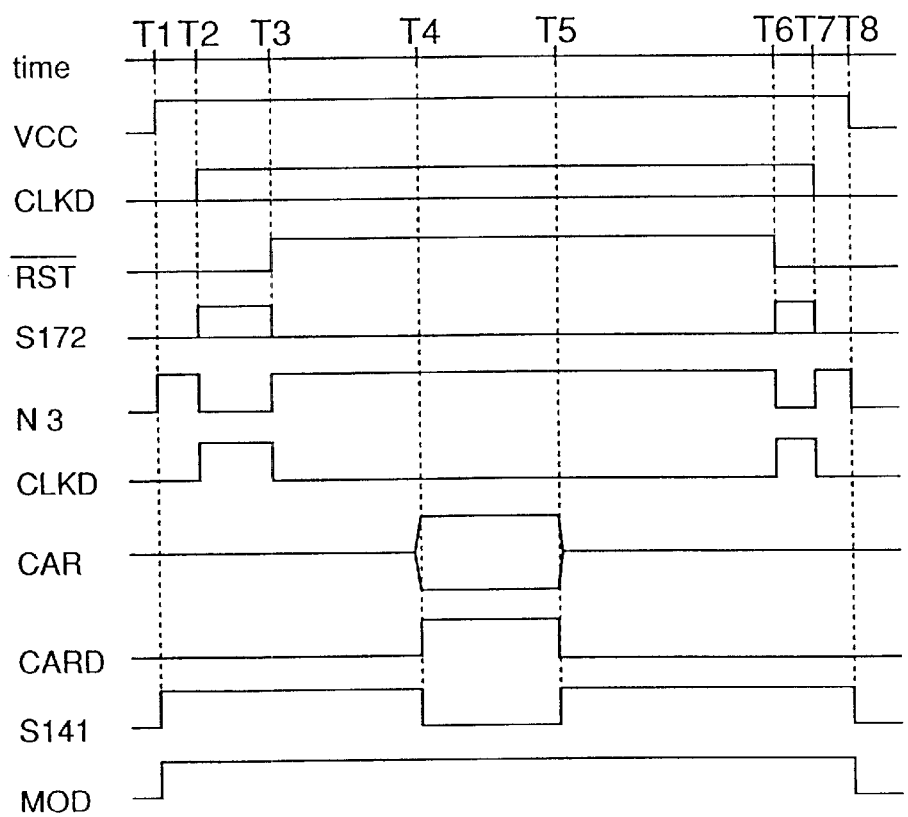
FIG. 5 is a timing chart showing an operation of the IC card according to the present invention in the contact mode.

FIG. 4 is a timing chart showing an operation of the IC card according to the present invention in the contact-free mode. FIG. 5 is a timing chart showing an operation of the IC card according to the present invention in the contact mode.

The operation of the IC card in the contact-free mode and the contact mode will be explained as follows.

(1) Contact-Free Mode

In the contact-free mode, the coil 111 is magnetically coupled to the coils of the reader/writer. On the other hand, the contact terminals of the contact field 160 are not connected any terminals of the reader/writer.

When the carrier wave CAR output from the reader/writer is received at a tuning circuit comprised of the coil 111 and the capacitor 112 at the time T1, the received carrier wave CAR is full-wave rectified by the voltage rectification part 120. Thereby, the direct voltage DCV at the positive output + of the voltage rectification part 120 increases. The direct voltage DCV is supplied to the carrier detection part 130 as a power supply voltage.

At the time t2, when the direct voltage DCV reaches to a predetermined voltage level, the voltage supply part 126 outputs the power supply voltage VCC. The power supply voltage VCC is supplied to the circuits in the IC card. The carrier wave CAR received at coil 111 is divided into a predetermined voltage level by the resistors 131 and 132 in the carrier detection part 130. The divided voltage level of the carrier wave CAR is applied to the gate of the NMOS 133. Thereby, the NMOS 133 turns on/off in response to the frequency of the clock signal CLK Since the resistor 134 and the capacitor 135 are connected to the NMOS 133 as load, the node N1 is maintained at the L level during the carrier wave CAR is applied to the carrier detection part 130. Thus, the carrier detection signal CARD output from the node N2 is set at the H level. The carrier detection signal CARD is inverted by the inverter 141 and thus a signal S141 having the L level is transferred to the OR circuit 142.

On the other hand, since the contact terminals of the contact field 160 are not connected to the contact terminals of the reader/writer, the contact terminals 163 and 164 are pull-downed to the ground potential via the resistors 166 and 167. That is, the contact terminals 163 and 164 are set at the L level. Since the inverter 171 outputs the H level based on the L level of the contact terminal 163, the NOR circuit 172 outputs the L level. Then the NMOS 173 enters to the off state and the node N3 is set at the H level. As a result, the inverter 176 outputs the clock detection signal CLKD having L level to the mode direction circuit 140. At this time, since the reset signal /RST is also set at the L level, the OR circuit 142 outputs the mode signal MOD having the L level. The operation mode of the CPU 150 is set at the contact-free mode in response to the received mode signal MOD having the L level.

When the voltage level of the carrier wave CAR decreases at the time T3, the power supply from the voltage power supply part 126 is stopped. Therefore, the operation of the IC card is halted.

(2) Contact Mode

In the contact mode, since the IC card is set at the reader/writer, the contact terminals 161 through 165 of the contact field 160 are contacted with the terminals of the reader/writer. On the other hand, the carrier wave CAR is not applied to the coil 111.

When the power supply voltage VCC is supplied to the contact terminal 161 from the reader/writer at the time T1, the power supply voltage VCC is supplied to the circuits in the IC card. At the time T1, the clock signal CLK applied to the contact terminal 163 and the reset signal /RST applied to the contact terminal 164 are in the L level. Therefore, the signal S172 output from the NOR circuit 172 of the clock detection part 170 goes to the L level and thus the signal at the node N3 goes to the H level. As a result, the clock detection signal CLKD goes to the L level. On the other hand, since the direct voltage DCV is not supplied to the carrier detection part 130, the carrier detection signal CARD is in the L level and thus the signal S141 goes to the H level. Thereby, the mode signal MOD goes to the H level. As a result, the operation mode of the CPU 150 is set to the contact mode.

When the supply of the clock signal CLK to the contact terminal 163 is started at the time t2, the NOR circuit 172 outputs the signal S172 as the clock signal CLK Thereby, the NMOS 173 tuns on/off in response to the frequency of the clock signal CLK. Since the resistor 174 and the capacitor 175 are connected to the NMOS 173 as a load, the node N3 is maintained at the L level during the H level of the signal S172 is applied to the gate of the NMOS 173. Thus, the clock detection signal CLKD is set to the H level in this time period. At this time, since the mode signal MOD is already set to the H level, the contact mode is not changed.

At the time T3, when the reset signal /RST applied to the contact terminal 164 goes to the H level (the reset state is terminated), the NOR circuit 172 outputs the signal S172 having the L level. Thereby, the NMOS 173 is changed to the off state and thus the detection of the clock signal CLK is stopped. The node N3 and the clock detection signal CLKD are changed to the L level. At this time, since the reset signal /RST and the signal S141 are set to the H level, the contact mode is not changed.

Here, in a case where a strong alternating signal such as the carrier wave CAR is induced in the coil 111 from the time T4 to the time T5 is assumed. As explained in the contact-free mode, the direct voltage DCV is applied to the carrier detection part 130 because the strong alternating signal (the carrier wave CAR) is induced in the coil 111. Since the carrier detection signal CARD is changed to the H level in response to the direct voltage DCV, the signal S141 is changed to the L level. However, since the reset signal /RST is already set to the H level, that is, the mode signal MOD is set to the H level, the contact mode is not changed.

At the time T6, when the reset signal /RST goes to the L level (the reset state is started), the NOR circuit 172 outputs the signal S172 as the clock signal CLK Since the node N3 is changed to the L level, the clock detection signal CLKD is set to the H level. However, since the mode signal MOD is in the H level, the contact mode is not changed.

At the time T7, when the clock signal CLK is stopped, the NOR circuit 172 outputs the signal S172 having the L level. Thereby, the node N3 is set to the H level and the clock detection signal CLKD is set to the L level. At this time, since the carrier detection signal CARD is in the L level (the signal S141 is in the H level), the mode signal MOD is maintained at the H level. That is, the contact mode is not changed.

At the time T8, when the supplying the power supply voltage VCC to the contact terminal 161 from the reader/writer is stopped, the operation of the IC card is completely halted.

As explained above, the clock detection signal CLKD and the reset signal /RST are given priority to the carrier detection signal CARD. The mode direction circuit which receives the carrier detection signal CARD, the clock detection signal CLKD and the reset signal /RST are explained as an example to give the priority Thereby, if the carrier detection signal CARD is changed to the H level due to the induced alternating voltage during the IC card operates in the contact mode, the contact mode can be maintained. That is, the contact mode is not changed to the contact-free mode.

Furthermore, the clock detection part 170 includes the NOR circuit 172 that outputs (or transfers) the clock signal CLK when the reset signal /RST having the L level and does not output (or transfer) the clock signal CLK when the reset signal /RST having the H level (that is, the detection of the clock signal CLK is stopped). Thereby, since the NMOS 173 enters into the off state when the reset signal /RST is in the H level, the power consumption of the clock detection part 170 can be reduced.

The present invention is not limited to the above-explained preferred embodiment. The present invention can include the following modifications. For example, the modifications (a) through (e) exist as the modified circuit schemes.

(a) The circuit scheme of the carrier detection part 130 is not limited to the embodiment shown in FIG. 1. Any circuits, which can detect the carrier frequency component in the carrier wave received by the coil 111, can be used as the carrier detection part 130.

(b) The circuit scheme of the clock detection part 170 is not limited to the embodiment shown in FIG. 1. Any circuits, which can detect the clock signal CLK applied to the contact terminal 163, can be used as the clock detection part 170. For example, the inverter 171 and the NOR circuit 172 shown in FIG. 1 may be omitted. In this case, the clock signal CLK is directly applied to the gate of the NMOS 173.

(c) In the preferred embodiment, the clock signal CLK and the reset signal /RST are used to generate the mode signal MOD giving the priority to the contact-free mode. However, only the reset signal /RST may be used to generate the mode signal MOD. In this case, the clock detection part 170 can be omitted. Moreover, the OR circuit 142 having three input terminals is replaced with an OR circuit having two input terminals. That is, such the OR circuit has a first input terminal receiving the signal S141 and a second input terminal receiving the reset signal /RST.

(d) In the preferred embodiment, the clock signal CLK and the reset signal /RST are used to generate the mode signal MOD giving the priority to the contact-free mode. However, only the clock signal CLK may be used to generate the mode signal MOD. In this case, the inverter 171 and the OR circuit 172 can be omitted. Furthermore, the clock signal CLK supplied to the contact terminal 163 is directly applied to the gate of the NMOS 173. Moreover, the OR circuit 142 having three input terminals is replaced with an OR circuit having two input terminals. That is, such the OR circuit has a first input terminal receiving the signal S141 and a second input terminal receiving the clock detection signal CLKD.

(e) In the preferred embodiment, the OR circuit 142 and the inverter 141 are used as the mode direction circuit. However, the mode direction circuit is not limited to such OR circuit and inverter. That is, any logic circuits, which receive the carrier detection signal CARD, the clock detection signal CLKD and the reset signal /RST and which can give the priority to the contact-free mode, can be used.

As explained in detail, the present invention has a mode direction circuit which can direct the contact mode even if an undesirable electric magnetic induction occurs in the coil when the IC card receives the reset signal or the clock signal during the contact mode. Therefore, since the contact mode has a priority over the contact-free mode when the IC card operates in the contact mode, the contact mode is not changed by the undesirable electric magnetic induction.

While the preferred form of the present invention has been described, it is to be understood that modifications will be apparent to those skilled in the art without departing from the spirit of the invention.

The scope of the invention, namely, is to be determined solely by the following claims.

What is claimed is:

1. An integrated circuit card comprising:
a contact terminal which is to be contacted with an external device and which receives a first control signal from the external device, the first control signal comprising a reset signal;
a first control signal detection circuit which is coupled to the contact terminal, which detects the first control signal and which outputs a first detection signal;
a coil which is to be magnetically coupled to the external device and which receives a second control signal from the external device;
a second control signal detection circuit which is coupled to the coil, which detects the second control signal and which outputs a second detection signal;
a mode direction circuit which receives the first and second detection signals and outputs a mode signal designating a contact-free mode and a contact mode, wherein the mode direction circuit outputs the mode signal designating the contact-free mode when the first detection signal is in an inactive state and the second detection signal is in an active state and wherein the mode direction circuit outputs the mode signal designating the contact mode regardless of the state of the second detection signal when the first detection signal is in the active state; and
a processing circuit which receives the mode signal and which performs a predetermined operation based on the contact mode and the contact-free mode designated by the mode signal.

2. The integrated circuit card as set forth in claim 1, wherein the mode direction circuit comprises a logic circuit which has a first input terminal for receiving the second detection signal and a second input terminal for receiving the first detection signal and an output terminal for outputting the mode signal.

3. The integrated circuit card as set forth in claim 1, wherein the first control signal further comprises a clock signal.

4. The integrated circuit card as set forth in claim 1, wherein the first control signal detection circuit comprises a second logic circuit which has a first input terminal for receiving a clock signal and a second input terminal for receiving the reset signal.

5. The integrated circuit card as set forth in claim 4, wherein at least one of the first and second input terminals is coupled to a ground potential through a resistance.

6. An integrated circuit card comprising:
a plurality of terminals for receiving data, a first control signal and a power supply by mechanical contact to the terminals, the first control signal comprising a reset signal;
a coil for receiving data, a second control signal and a power supply by electromagnetic induction;
a mode designating circuit for designating a contact mode regardless of the second control signal when the first control signal is received and for designating a contact-free mode when the second control signal is received; and
a processing circuit for operating in the contact mode based on the contact mode designated by the mode designating circuit and for operating in the contact-free mode based on the contact-free mode designated by the mode designating circuit.

7. The integrated circuit card as set forth in claim 6, wherein the first control signal further comprises a clock signal.

8. The integrated circuit as set forth in claim 6, wherein the mode designating circuit comprises a second logic circuit which has a first input terminal for receiving a clock signal and a second input terminal for receiving the reset signal.

9. The integrated circuit as set forth in claim 8, wherein at least one of the first and second input terminals is coupled to a ground potential through a resistance.

10. An integrated circuit comprising:
a first node which is to be contacted with an external device and which receives a first control signal from the external device, the first control signal comprising a reset signal;
a first control signal detection circuit which is coupled to the first node, which detects the first control signal and which outputs a first detection signal;
a second node which is to be coupled to a coil and which receives a second control signal from the external device via the coil and wherein the coil is to be magnetically coupled to the external device;
a second control signal detection circuit which is coupled to the second node, which detects the second control signal and which outputs a second detection signal;
a mode direction circuit which receives the first and second detection signals and outputs a mode signal designating a contact-free mode and a contact mode, wherein the mode direction circuit outputs the mode signal designating the contact-free mode when the first detection signal is in an inactive state and the second detection signal is in an active state and wherein the mode direction circuit outputs the mode signal designating the contact mode regardless of the state of the second detection signal when the first detection signal is in the active state; and
a processing circuit which receives the mode signal and which performs a predetermined operation based on the contact mode and the contact-free mode designated by the mode signal.

11. The integrated circuit as set forth in claim 10, wherein the mode direction circuit comprises a logic circuit which has a first input terminal for receiving the second detection signal and a second input terminal for receiving the first detection signal and an output terminal for outputting the mode signal.

12. The integrated circuit as set forth in claim 10, wherein the first control signal further comprises a clock signal.

13. The integrated circuit as set forth in claim 10, wherein the first control signal detection circuit comprises a second logic circuit which has a first input terminal for receiving a clock signal and a second input terminal for receiving the reset signal.

14. The integrated circuit as set forth in claim 13, wherein at least one of the first and second input terminals is coupled to a ground potential through a resistance.

* * * * *